US008081488B2

(12) United States Patent
Kondo et al.

(10) Patent No.: US 8,081,488 B2
(45) Date of Patent: Dec. 20, 2011

(54) PORTABLE ELECTRONIC DEVICE

(75) Inventors: Yasuhiro Kondo, Gunma (JP); Takahiro Kitai, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 534 days.

(21) Appl. No.: 12/237,899

(22) Filed: Sep. 25, 2008

(65) Prior Publication Data

US 2009/0084040 A1    Apr. 2, 2009

(30) Foreign Application Priority Data

Sep. 27, 2007   (JP) ................ 2007-250757

(51) Int. Cl.
*H05K 5/00* (2006.01)
*H05K 7/14* (2006.01)
*H05K 7/18* (2006.01)
(52) U.S. Cl. ........ 361/801; 361/752; 361/759; 361/796; 361/679.01
(58) Field of Classification Search ............... 361/752, 361/759, 796, 801, 679.01, 732; 429/97
See application file for complete search history.

(56) References Cited

U.S. PATENT DOCUMENTS

| 5,621,618 | A | * | 4/1997 | Komiyama ............... 361/732 |
| 5,716,730 | A | * | 2/1998 | Deguchi ................... 429/97 |
| 7,274,554 | B2 | * | 9/2007 | Kang et al. ............. 361/679.01 |
| 7,606,022 | B2 | * | 10/2009 | Kim .................... 361/679.01 |
| 2006/0165407 | A1 | | 7/2006 | Ueda et al. |
| 2007/0048599 | A1 | * | 3/2007 | Choi ....................... 429/97 |

FOREIGN PATENT DOCUMENTS

| CN | 2411497 Y | 12/2000 |
| CN | 101399912 A | 4/2009 |
| JP | 10-021350 A | 1/1989 |
| JP | 01-225062 A | 7/1989 |
| JP | 09022585 A | 1/1997 |
| JP | 2000-133963 A | 5/2000 |
| JP | 2000-165714 A | 6/2000 |
| JP | 2000-330172 A | 11/2000 |
| JP | 2001-223480 A | 8/2001 |

(Continued)

OTHER PUBLICATIONS

Chinese Office Action dated Feb. 12, 2010, issued in corresponding Chinese Patent Application No. 200810161072.9.

(Continued)

*Primary Examiner* — Anthony Haughton
(74) *Attorney, Agent, or Firm* — Westerman, Hattori, Daniels & Adrian, LLP

(57) ABSTRACT

A portable electronic device includes: a casing provided therein with a battery compartment, the battery compartment being given an opening for the installation of the battery; a cover body pivotally supported on the casing to open and close the opening; a spring part for causing the battery inside the battery compartment to be spring-biased in a direction toward the opening; a lock lever provided to the casing, the lock lever being capable of moving back and forth between a locking position entering the opening and a lock releasing position retreating from the opening, while being spring-biased in a direction from the lock releasing position to the locking position; and a pressure applying part formed on the inner surface of the cover body, the pressure applying part pressing the lock lever placed in the lock releasing position toward the locking position immediately before the cover body is completely closed.

11 Claims, 6 Drawing Sheets

FOREIGN PATENT DOCUMENTS

| | | |
|---|---|---|
| JP | 2002-279950 A | 9/2002 |
| JP | 2003-142841 A | 5/2003 |
| JP | 2003-317682 A | 11/2003 |
| JP | 2004-079543 A | 3/2004 |
| JP | 2005-208143 A | 8/2005 |
| JP | 2005-235579 A | 9/2005 |

OTHER PUBLICATIONS

Japanese Office Action dated May 13, 2011 (mailing date), issued in corresponding Japanese Patent Application No. 2007-250757.

* cited by examiner

PORTABLE ELECTRONIC DEVICE

CROSS REFERENCE OF RELATED APPLICATION

The disclosure of Japanese Patent Application No. 2007-250757 filed on Sep. 27, 2007 is incorporated herein by reference.

FIELD OF THE INVENTION

The present invention relates to a portable electronic device such as a digital camera. The present invention more particularly relates to a portable electronic device with a cartridge body such as a battery or a card-type IC chip that is removably stored in the portable electronic device.

BACKGROUND OF THE INVENTION

As shown in FIGS. 6A, 6B and 6C, a digital camera has a battery compartment 3 provided inside a casing 1 for storing a battery 8. A coil spring 5 is provided at the bottom of the battery compartment 3 that causes the battery 8 inside the battery compartment 3 to be spring-biased in a direction of ejection.

A lock lever 41 is pivotally supported on the casing 1 in a position near the opening for the battery compartment 3. The lock lever 41 is capable of moving back and forth between a locking position in which the battery 8 is locked as shown in FIG. 6C, and a lock releasing position in which the lock of the battery 8 is released as shown in FIG. 6B. The lock lever 41 is spring-biased in a direction from the lock releasing position to the locking position.

In this digital camera, when the battery compartment 3 shown in FIG. 6A receives the battery 8 to be installed therein as shown in FIG. 6B, an end of the battery 8 presses the lock lever 41, so the lock lever 41 pivotally rotates from the locking position to the lock releasing position. In this condition, the battery 8 is inserted into the battery compartment 3. The battery 8 is pressed further into the back portion of the battery compartment 3 against the coil spring 5. As a result, the lock lever 41 under spring bias pivotally rotates from the lock releasing position to the locking position as shown in FIG. 6C, thereby locking the battery 8.

Thereafter a cover body (not shown) for opening and closing the battery compartment 3 of the casing 1 is closed to complete the processing.

As discussed above, the process necessary for the installation of the battery 8 in the battery compartment 3 of the casing 1 includes pressing the battery 8 placed in the condition shown in FIG. 6B in the manner stated above to lock the battery 8 by the lock lever 41 as shown in FIG. 6C, and closing the cover body thereafter. When an attempt is made to close the cover body with the battery 8 not being pressed into the back portion of the battery compartment 3 as shown in FIG. 6B, the inner surface of the cover body presses the battery 8. This also causes the lock lever 41 to pivotally rotate from the lock releasing position to the locking position, thereby allowing the installation of the battery 8.

This case however requires the cover body to press the battery into its end position of movement in the back portion of the battery compartment. Thus, the cover body held in a closed position receives reaction force exerted by the battery. As a result, strain may be exerted on an engaging structure for holding the cover body in a closed position, so the engaging structure may be damaged with long-term use.

In response to the case where an attempt is made to close the cover body with the battery not being pressed into the back portion of the battery compartment, there has been suggested a structure in which a protrusion provided to the cover body is received by the lock lever to prevent the cover body from being completely closed.

However, the structure for preventing the cover body from being completely closed by receiving a protrusion provided to the cover body by the lock lever fails to take a convenient way of battery installation in which the battery is pressed into the back portion to be locked by the closing of the cover body. This hence results in the loss of convenience.

SUMMARY OF THE INVENTION

The present invention is intended to provide a portable electronic device capable of taking a convenient way of installation in which a cartridge body such as a battery is pressed into the back portion of a compartment by closing a cover body to lock the cartridge body. Further, in the portable electronic device of the present invention, with the cover body held in a closed position, no reaction force is applied from the cartridge body such as a battery upon the cover body.

The portable electronic device of the present invention includes a casing, a cover body, a spring part, a lock lever, and a pressure applying part. The casing is provided therein with a compartment for a cartridge body as a component. The compartment is given an opening for the installation of the cartridge body. The cover body is pivotally supported on the casing to open and close the opening, and is capable of being held in a position for closing the opening. The spring part causes the cartridge body inside the compartment to be spring-biased in a direction toward the opening. The lock lever is provided to the casing. The lock lever is capable of moving back and forth between a locking position entering the opening and a lock releasing position retreating from the opening, while being spring-biased in a direction from the lock releasing position to the locking position. The pressure applying part is formed on the inner surface of the cover body. The pressure applying part presses the lock lever placed in the lock releasing position toward the locking position immediately before the cover body is completely closed.

The lock lever is formed with a cam surface that presses the cartridge body toward the back portion of the compartment on receipt of a pressure applied from the pressure applying part.

According to this portable electronic device of the present invention, when the cartridge body is installed in the compartment of the casing, an end of the cartridge body presses the lock lever, so the lock lever pivotally rotates from the locking position to the lock releasing position. In this condition, the cartridge body is inserted into the compartment. The cartridge body is pressed further into the back portion of the compartment against spring bias. As a result, the lock lever under spring bias pivotally rotates from the lock releasing position to the locking position, thereby locking the cartridge body. Thereafter the cover body is closed and held in a closed position.

Alternatively, after the cartridge body is inserted into the compartment of the casing, the cover body is closed without pressing the cartridge body further. This first causes the inner surface of the cover body to press the cartridge body, so the cartridge body moves toward the back portion of the compartment against spring bias. Thereafter the pressure applying part formed on the inner surface of the cover body comes into contact with the lock lever placed in the lock releasing position. Then the cover body is closed further, by which the pressure applying part presses the lock lever to cause the pivotal rotation of the lock lever from the lock releasing position to the locking position. The lock lever presses the cartridge body further into the back portion of the compartment. As a result, the lock lever placed in the locking position locks the cartridge body, and the cover body is held in a closed position.

A particular configuration is such that, the pressure applying part of said cover body is received by the lock lever placed in the lock releasing position by applying a first force to close the cover body, and the pressure applying part forces the lock lever placed in the lock releasing position to move toward the locking position by applying a second force greater than said first force to close the cover body.

According to this particular configuration, a user first applies the first force to close the cover body, by which the pressure applying part of the cover body is received by the lock lever placed in the lock releasing position. Thus the user receives reaction force in response to the first force, from which the user is allowed to recognize that the cover body is being closed with the cartridge body not being pressed completely. Next, when the user applies the second force greater than the first force to close the cover body, the pressure applying part of the cover body forces the lock lever placed in the lock releasing position to move toward the locking position. Then the lock lever presses the cartridge body further into the back portion of the compartment. As a result, the lock lever placed in the locking position locks the cartridge body, and the cover body is held in a closed position.

A particular configuration is such that, the inner surface of the cover body includes a sealing surface that closely contacts an opening edge for surrounding an opening of the compartment of the casing when the cover body is closed, the sealing surface applies no pressure upon the cartridge body inside the compartment.

According to this particular configuration, the cover body in a closed position does not receive reaction force from the cartridge body. Further, the sealing surface closely contacts the opening edge of the casing, thereby preventing entry of water from outside into the compartment.

A still particular configuration is such that, the cover body includes a metal plate pivotally supported on the casing, a sealing cover fixed to the inner surface of the metal plate, and a sliding cover slidably engaging the metal plate. The inner surface of the sealing cover defines the sealing surface. An end of the sliding cover comes into engagement with the casing by the sliding movement of the sliding cover to hold the cover body in a closed position.

According to this particular configuration, when the cover body in an open position is subjected to strain in a direction to further open the cover body, the metal plate is elastically deformed to absorb the strain. Thus the cover body is not damaged.

The portable electronic device of the present invention is capable of taking a convenient way of installation in which a cartridge body is pressed into the back portion of a compartment by closing a cover body to lock the cartridge body. Further, in the portable electronic device of the present invention, with the cover body held in a closed position, no reaction force is applied from the cartridge body upon the cover body.

DETAILED DESCRIPTION OF THE EMBODIMENTS

In a preferred embodiment discussed in detail below with reference to drawings, the present invention is implemented in a digital camera.

Figure 3:
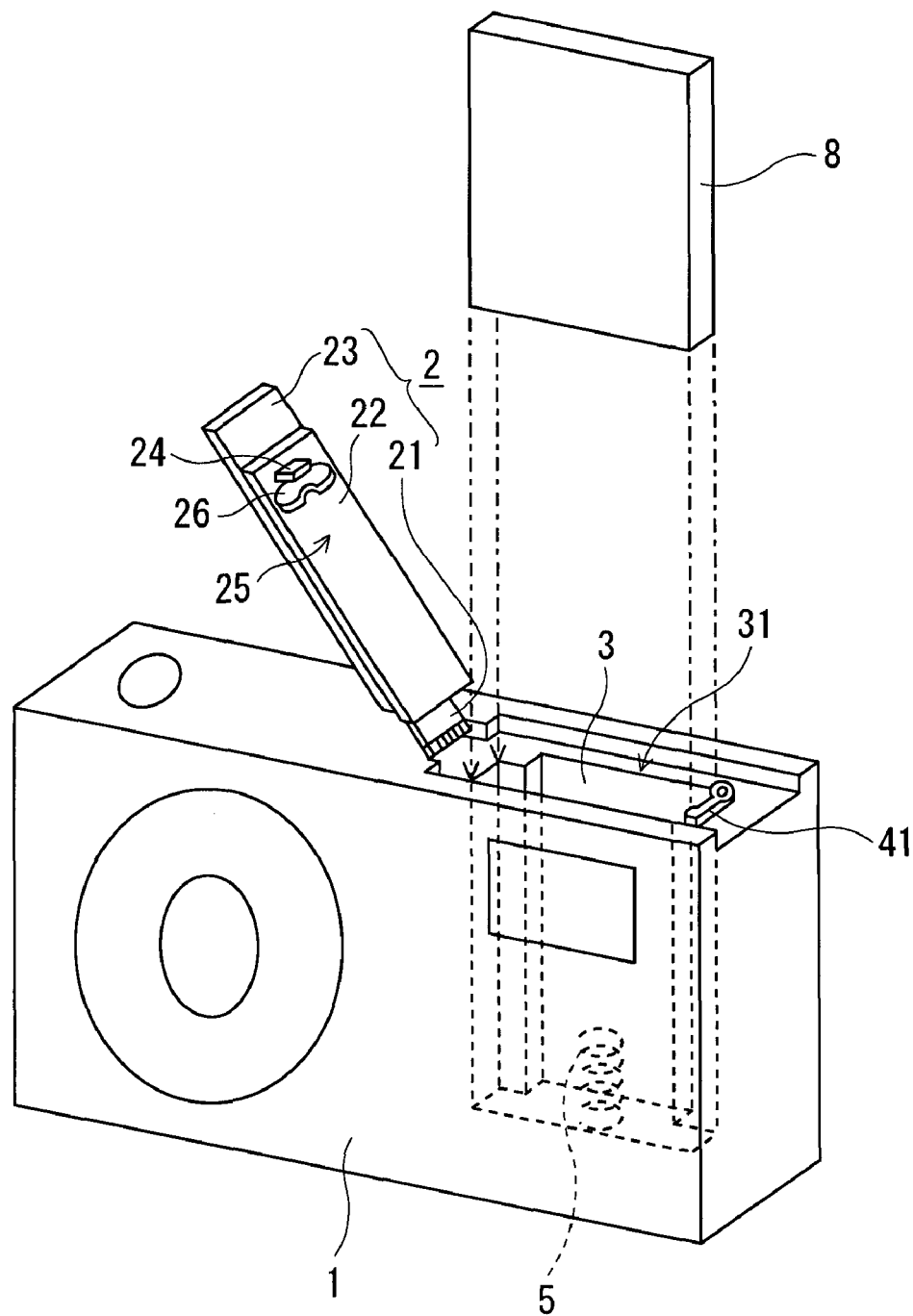
FIG. 3 is a perspective view showing a condition of the digital camera where the cover body is open.

As shown in FIG. 3, in the digital camera according to the present invention, a battery compartment 3 to store therein a battery 8 is arranged inside a casing 1, and the battery compartment 3 is given an opening on the upper surface of the casing 1. A coil spring 5 for causing the battery 8 to be spring-biased in a direction of ejection is provided at the bottom of the battery compartment 3.

Figure 1:
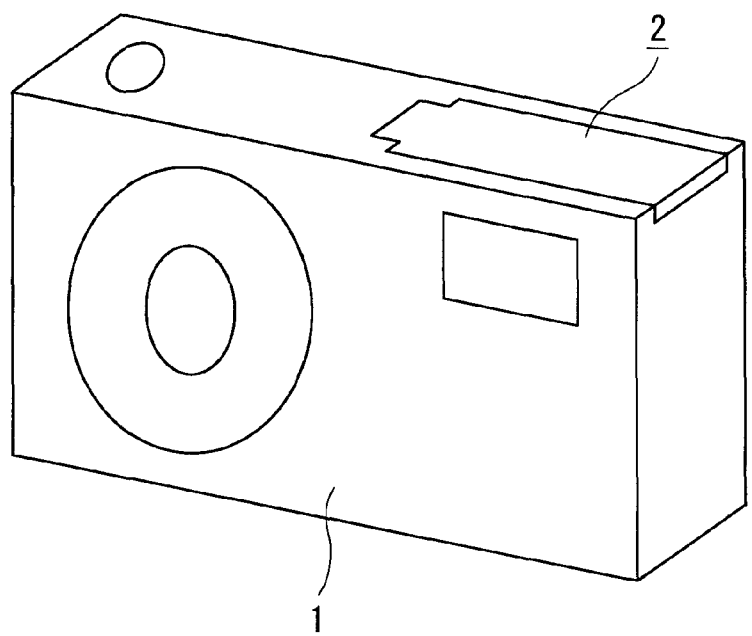
FIG. 1 is a perspective view of a digital camera according to the present invention.
Figure 2:
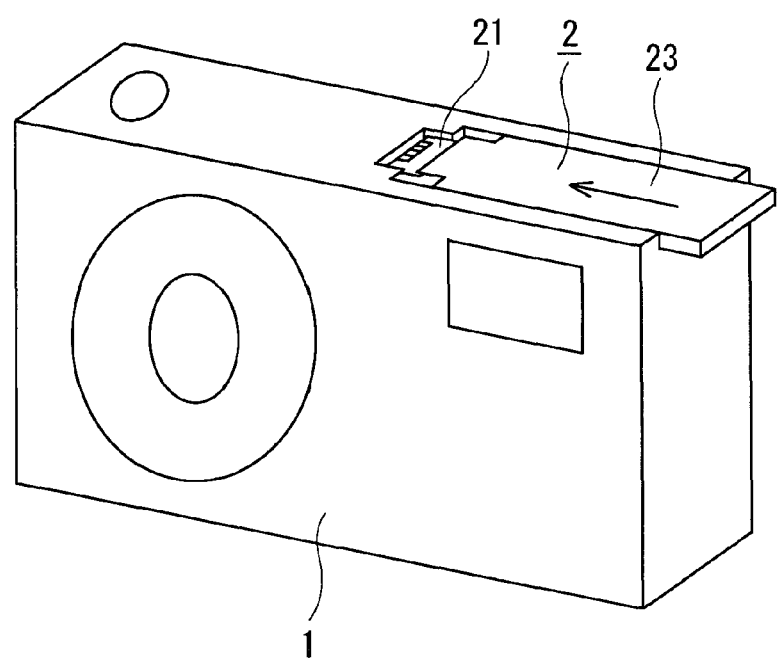
FIG. 2 is a perspective view showing a condition of the digital camera where a sliding cover of a cover body slides out.

As shown in FIGS. 1 and 2, a cover body 2 for opening and closing the battery compartment 3 is arranged on the upper surface of the casing 1. The cover body 2 is pivotally supported at the root end on the casing 1, and is capable of being turned between a closed position shown in FIG. 1 and an open position shown in FIG. 3.

Figure 4:
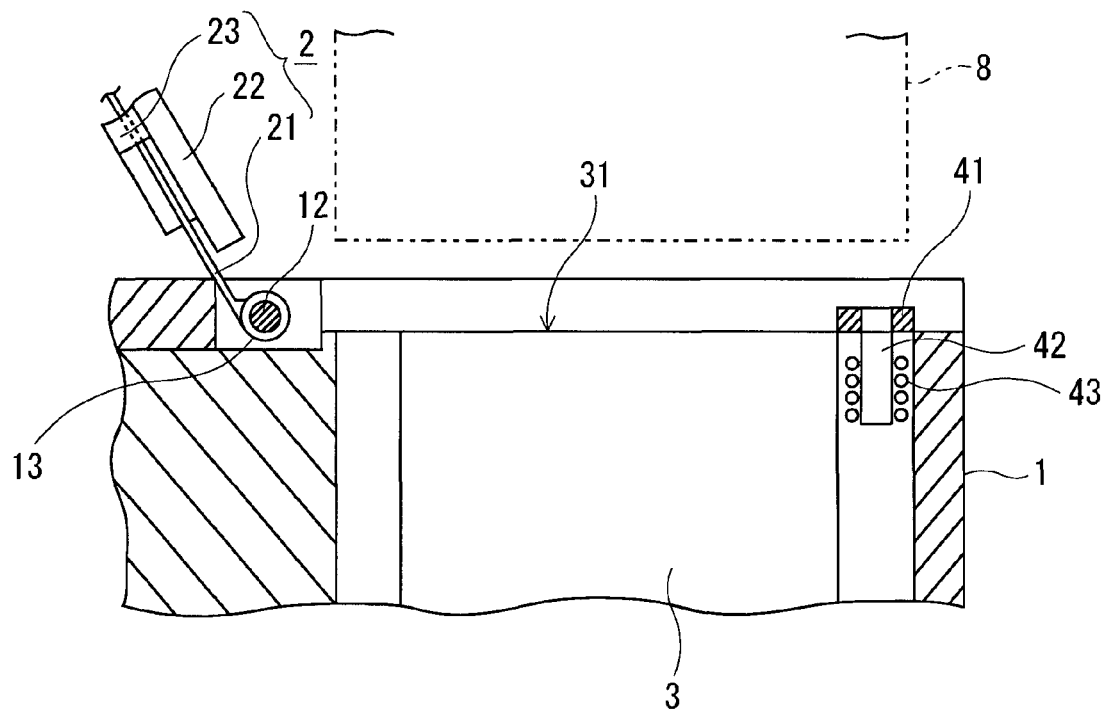
FIG. 4 is a sectional view showing a condition of the digital camera where the cover body is open.

As shown in FIG. 3, the cover body 2 includes a metal plate 21 in the form of a strip, a sealing cover 22 fixed to the inner surface of the metal plate 21, and a sliding cover 23 slidably engaging the metal plate 21. A sealing surface 25 is formed on the inner surface of the sealing cover 22. The root end of the metal plate 21 is coupled to a pivot 12 provided in a horizontal position to the casing 1 as shown in FIG. 4, thereby pivotally supporting the cover body 2 on the casing 1. The pivot 12 is equipped with a torsion spring 13 that causes the cover body 2 to be spring-biased in a direction from a closed position to an open position.

When the cover body 2 in the open position as shown in FIG. 3 is closed to be brought to a condition of FIG. 2, and the sliding cover 23 is caused to slide in the direction of an arrow indicated in FIG. 2, a locking portion (not shown) provided to the sliding cover 23 engages a portion to be locked (not shown) provided to the casing 1. As a result, the cover body 2 is held in a closed position as shown in FIG. 1. When the sliding cover 23 of the cover body 2 in a closed position as shown in FIG. 1 is caused to slide in a direction opposite to the direction of the arrow of FIG. 2, the locking portion and the portion to be locked go out of engagement with each other. As a result, the cover body 2 under spring bias by the torsion spring 13 shown in FIG. 4 is opened accordingly as shown in FIG. 3.

As shown in FIG. 3, an opening edge 31 for surrounding the opening of the battery compartment 3 is defined in a recessed manner in the upper surface of the cover body 1. The closing of the cover body 2 causes the sealing cover 22 of the cover body 2 to closely contact the opening edge 31.

Figure 6A:
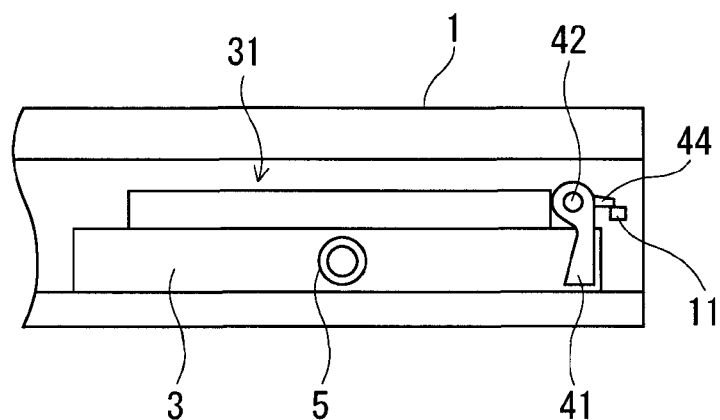
FIGS. 6A, 6B and 6C are plan views each showing the operation of a lock lever in a correct way of installation in which a battery is pushed under fingertip pressure to be pressed into the back portion of a battery compartment.
Figure 6B:
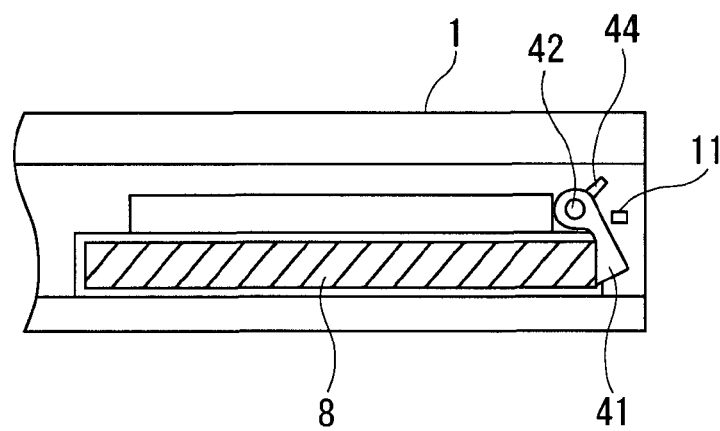

The opening edge 31 of the casing 1 is provided with a lock lever 41. The lock lever 41 is pivotally supported by a vertical pivot 42 on the casing 1 as shown in FIG. 4. The lock lever 41 is capable of pivotally rotating between a locking position entering the opening of the battery compartment 3 as shown in FIG. 6A, and a lock releasing position retreating from the opening of the battery compartment 3 as shown in FIG. 6B. By a torsion spring 43 attached to the pivot 42 as shown in FIG. 4, the lock lever 41 is spring-biased to rotate clockwise from the lock releasing position shown in FIG. 6B to the locking position shown in FIG. 6A.

Figure 6C:
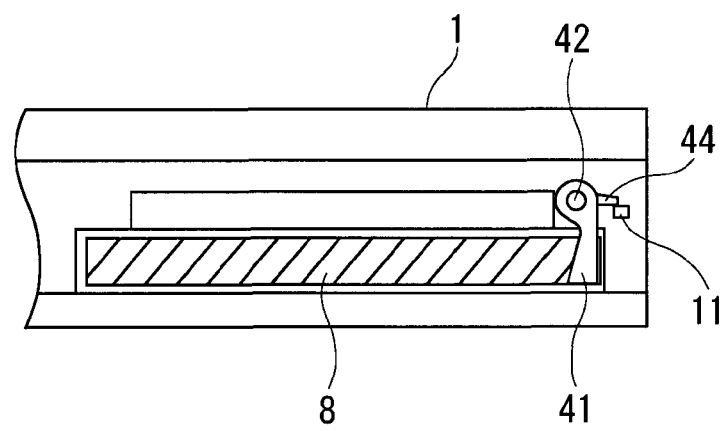
Figure 8A:
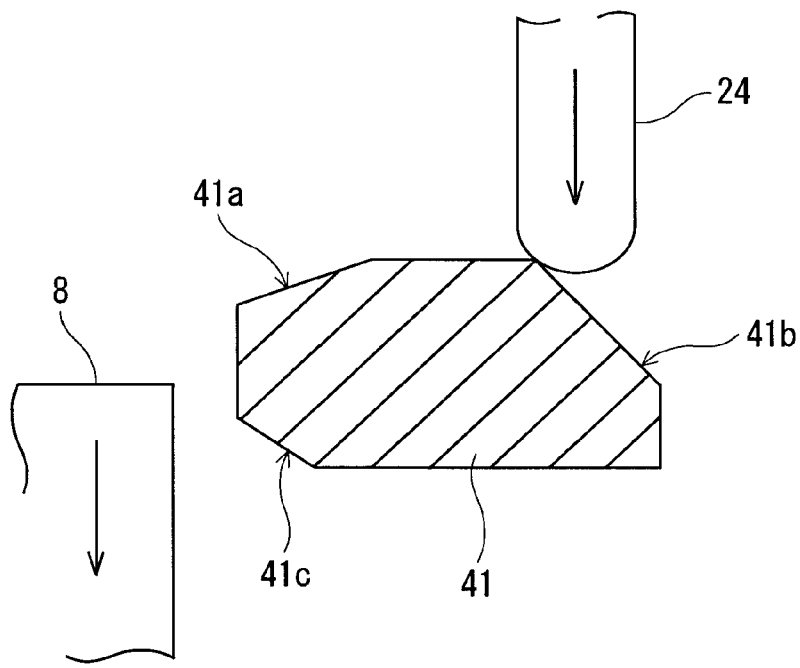
FIGS. 8A and 8B are enlarged sectional views each showing cam action of the lock lever in the convenient way of installation.
Figure 8B:
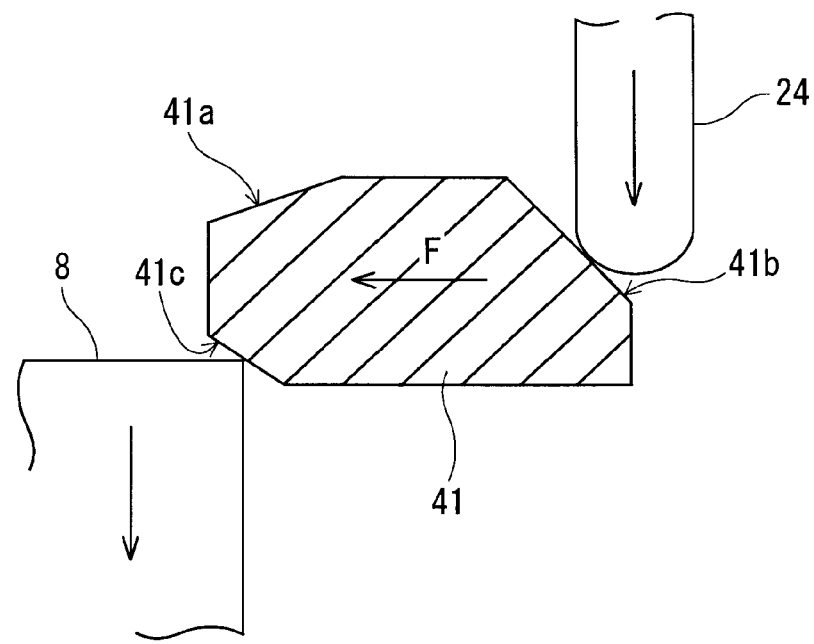

FIGS. 8A and 8B each show the shape of the front end of the lock lever 41 taken at the section perpendicular to each plane of FIGS. 6A, 6B and 6C. The front end of the lock lever 41 is given at three corners a first sloping surface 41a, a second sloping surface 41b and a third sloping surface 41c each of which exerts cam action discussed later.

With reference to FIGS. 6A, 6B and 6C, a projection 44 is formed on the side surface of the lock lever 41, and a stopper 11 sticking out of the opening edge 31 of the casing 1 is formed in a position facing the projection 44. This defines an end of pivotal rotation of the lock lever 41 in a clockwise direction, namely a locking position of the lock lever 41.

As shown in FIG. 3, the cover body 2 has a pressure applying part 24 sticking out of the sealing surface 25 of the sealing cover 22. The pressure applying part 24 is to contact the lock lever 41 by the closing of the cover body 2. The sealing surface 25 of the sealing cover 22 has a recess 26 to store therein the lock lever 41 (see FIG. 5).

In the digital camera discussed above, when the battery 8 is installed in the battery compartment 3 of the casing 1 shown in FIG. 6A, the cover body 2 is opened as shown in FIG. 4 to insert the battery 8 into the battery compartment 3. At this time, an end of the battery 8 applies a downward pressure upon the first sloping surface 41a of the lock lever 41 shown in FIG. 8A to exert cam action. This causes the lock lever 41 to pivotally rotate from the locking position shown in FIG. 6A to the lock releasing position shown in FIG. 6B.

Thereafter the battery 8 is pushed under fingertip pressure to be pressed into the back portion of the battery compartment 3 against the coil spring 5. As a result, the lock lever 41 under spring bias pivotally rotates to the locking position as shown in FIG. 6C, thereby locking the battery 8.

With reference to FIG. 2, the cover body 2 is thereafter closed and the sliding cover 23 is caused to slide in the direction of the arrow. Thus, the cover body 2 is held in a closed position as shown in FIG. 1 to complete the installation of the battery 8.

Figure 7A:
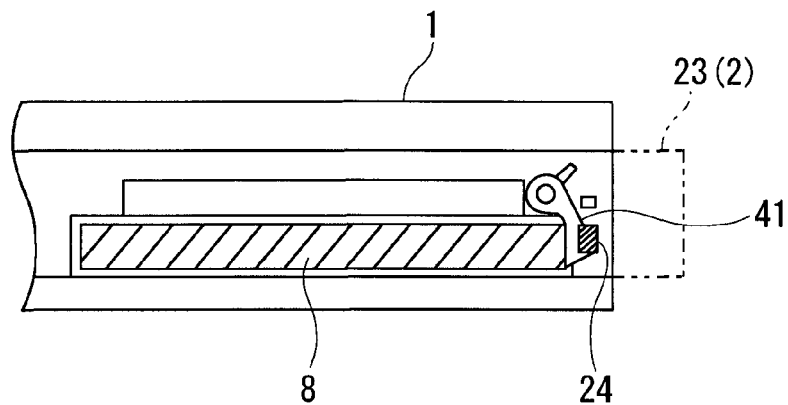
FIGS. 7A and 7B are plan views each showing the operation of the lock lever in a convenient way of installation in which a battery is pressed into the back portion of the battery compartment by closing the cover body.

A user may close the cover body 2 partway without pushing the battery 8 under fingertip pressure, with the battery 8 being inserted into the battery compartment 3 of the casing 1 as shown in FIG. 6B. In this case, the battery 8 is pressed by the inner surface of the cover body 2 to move toward the back portion of the battery compartment 3. Thereafter as shown in FIGS. 7A and 8A, the pressure applying part 24 of the cover body 2 comes into contact with the lock lever 41 placed in the lock releasing position.

As a result, the user receives large reaction force on the fingertip pressing the cover body 2. Thus the user can recognize by the increase of reaction force that the cover body 2 is being closed without pressing the battery 8 into the back portion of the battery compartment 3.

Figure 7B:
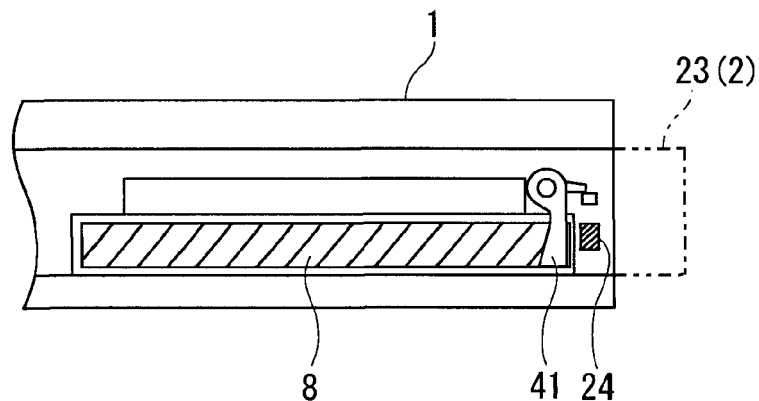

When the user presses the cover body 2 by applying greater force without regard for the above-mentioned recognition to place the cover body 2 in a completely closed position, the pressure applying part 24 of the cover body 2 applies a downward pressure upon the second sloping surface 41b of the lock lever 41 as shown in FIG. 8B in the course of placing the cover body 2 in a completely closed position. The second sloping surface 41b of the lock lever 41 has a slope relative to a horizontal plane, thereby exerting cam action. Thus, the pressure applying part 24 applies a clockwise rotating force F to the lock lever 41. As a result, the lock lever 41 pivotally rotates from the lock releasing position to the locking position as shown in FIG. 7B.

In the course of pivotal rotation of the lock lever 41 that has received the above-mentioned rotating force F, the third sloping surface 41c of the lock lever 41 exerts cam action as shown in FIG. 8B. Thus, the battery 8 is pressed further into the back portion of the battery compartment 3 by the pressure applied from the third sloping surface 41c. Thereafter as shown in FIG. 7B, the battery 8 is locked by the lock lever 41 placed in the locking position.

The sliding cover 23 of the cover body 2 in this condition is caused to slide in the direction of the arrow indicated in FIG. 2. As a result, the cover body 2 is held in a closed position as shown in FIG. 1 to complete the installation of the battery 8.

As discussed above, a user is allowed to take a convenient way of installation in which the battery 8 is locked by being pressed into the back portion of the battery compartment 3 by using the cover body 2. This realizes a higher degree of convenience than a conventionally employed device which prohibits such a convenient way of installation.

Figure 5:
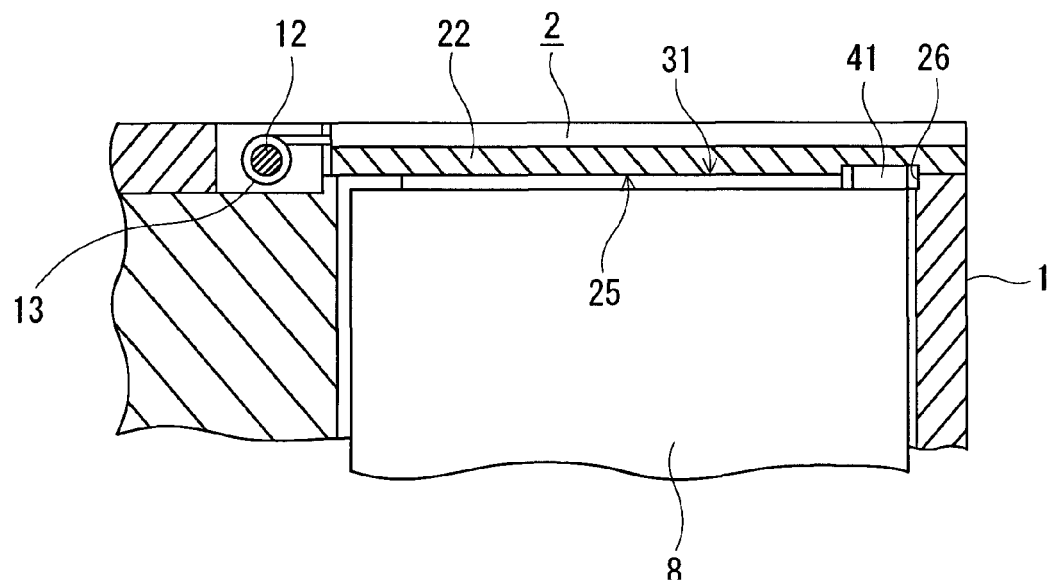
FIG. 5 is a sectional view showing a condition of the digital camera where the cover body is closed.

In the digital camera discussed above, the battery 8 is locked by the lock lever 41, and the cover body 2 is held in the completely closed position as shown in FIG. 5. In this condition, the sealing surface 25 on the sealing cover 22 of the cover body 2 is in close contact with the opening edge 31 of the casing 1 to provide anti-drip properties. Further, by the presence of slight space between the sealing surface 25 and the upper surface of the battery 8, the battery 8 does not press the cover body 2 in a direction to open the cover body 2. Thus, the strength of contact between the sealing surface 25 of the cover body 2 and the opening edge 31 of the casing 1 is not reduced to maintain anti-drop properties at a high level.

Further, no strain is exerted on an engaging structure between the cover body 2 placed in a closed position and the casing 1. Thus, the long-term use of the digital camera discussed above does not damage the engaging structure.

In the digital camera discussed above, with the cover body 2 placed in an open position as shown in FIGS. 3 and 4, the cover body 2 may be subjected to strain in a direction to further open the cover body 2. In this case, the root end of the metal plate 21 of the cover body 2 is elastically deformed to absorb the strain. Thus the cover body 2 is not damaged.

The structure of each part of the present invention is not limited to that shown in the preferred embodiment discussed above. Various modifications may be devised within the technical scope defined in claims. Further, the present invention may be implemented not only in digital cameras but also in portable electronic devices with various types of cartridge bodies such as batteries or card-type IC chips that are removably stored in the portable electronic devices.

The invention claimed is:
1. A portable electronic device, comprising:
   a casing provided therein with a compartment for a cartridge body as a component, the compartment being given an opening for the installation of the cartridge body;
   a cover body pivotally supported on said casing to open and close said opening, and is capable of being held in a position for closing the opening;

a spring part for causing the cartridge body inside said compartment to be spring-biased in a direction toward said opening;

a lock lever provided to said casing, the lock lever being capable of moving back and forth between a locking position entering said opening and a lock releasing position retreating from the opening, while being spring-biased in a direction from the lock releasing position to the locking position; and a pressure applying part formed on the inner surface of said cover body, said pressure applying part pressing the lock lever placed in the lock releasing position toward the locking position immediately before the cover body is completely closed.

2. The portable electronic device according to claim 1, wherein the pressure applying part of said cover body is received by the lock lever placed in the lock releasing position by applying a first force to close the cover body, and the pressure applying part forces the lock lever placed in the lock releasing position to move toward the locking position by applying a second force greater than said first force to close the cover body.

3. The portable electronic device according to claim 2, wherein the inner surface of the cover body includes a sealing surface that closely contacts an opening edge for surrounding an opening of the compartment of the casing when the cover body is closed, the sealing surface applying no pressure upon the cartridge body inside the compartment.

4. The portable electronic device according to claim 3, wherein
the cover body includes a metal plate pivotally supported on the casing, a sealing cover fixed to the inner surface of the metal plate, and a sliding cover slidably engaging the metal plate,
the inner surface of said sealing cover defines said sealing surface, and
an end of said sliding cover comes into engagement with the casing by the sliding movement of the sliding cover to hold the cover body in a closed position.

5. The portable electronic device according to claim 4, wherein said lock lever is formed with a cam surface that presses the cartridge body toward the back portion of the compartment on receipt of a pressure applied from said pressure applying part.

6. The portable electronic device according to claim 5, wherein said cartridge body is a battery or a card-type IC chip.

7. The portable electronic device according to claim 2, wherein said lock lever is formed with a cam surface that presses the cartridge body toward the back portion of the compartment on receipt of a pressure applied from said pressure applying part.

8. The portable electronic device according to claim 1, wherein the inner surface of the cover body includes a sealing surface that closely contacts an opening edge for surrounding an opening of the compartment of the casing when the cover body is closed, the sealing surface applying no pressure upon the cartridge body inside the compartment.

9. The portable electronic device according to claim 8, wherein
the cover body includes a metal plate pivotally supported on the casing, a sealing cover fixed to the inner surface of the metal plate, and a sliding cover slidably engaging the metal plate,
the inner surface of said sealing cover defines said sealing surface, and
an end of said sliding cover comes into engagement with the casing by the sliding movement of the sliding cover to hold the cover body in a closed position.

10. The portable electronic device according to claim 1, wherein said lock lever is formed with a cam surface that presses the cartridge body toward the back portion of the compartment on receipt of a pressure applied from said pressure applying part.

11. The portable electronic device according to claim 1, wherein said cartridge body is a battery or a card-type IC chip.

* * * * *